United States Patent Office 3,154,397
Patented Oct. 27, 1964

3,154,397
HERBICIDAL COMPOSITION AND METHOD
Robert T. Martin, Westminster, Calif., assignor to The Dow Chemical Company, Midland, Mich., a corporation of Delaware
No Drawing. Filed June 30, 1960, Ser. No. 39,779
14 Claims. (Cl. 71—2.6)

This invention relates to dust-free herbicidal products and to methods for preparing same. The invention also relates to a method of controlling noxious vegetation by the use of dust-free herbicidal products.

Solid materials commonly called "carriers" have heretofore been mixed by various methods together with haloaryloxy-substituted aliphatic acids and other herbicides in order to produce dry formulations for the control of noxious vegetation. However, certain disadvantages still remain in the use of conventional dry formulations. One disadvantage is that these dry formulations produced by dispersing haloaryloxy-substituted aliphatic acid and other herbicides on solid carriers possess varying amounts of extremely finely divided particles or fines such that in aerial applications as, for example, from airplanes or mechanical applicators, the fines float in the air and are frequently carried via air currents to areas of desirable vegetative growth thereby injuring or destroying said vegetation. Not infrequently these areas are reasonably remote from the area of treatment. The damage resulting from particle drift in air is serious enough to call for its prohibition or restriction in many instances thereby compelling farmers to resort to older and more costly and inefficient methods of application. The presence of finely divided particles or fines is objectionable not only in view of the aforesaid reasons, but also because they represent loss of material from areas where treatment is desired. Another disadvantage resides in the method of preparation of conventional granular herbicides. In such operations, the herbicides are usually incorporated either in the solid carrier followed by tumbling operations for drying or as a part of grinding operations which reduce the component parts to the appropriate particle size. These operations are expensive and time consuming and furthermore do not produce a dust-free product. Moreover, frequently in drying operations, the toxicant is transported to the surface by the evaporation of water or other solvent and form crystalline blooms on the surface which thereafter rub off producing dusts and fines of 100 percent herbicidal material.

In the known granular or pelleted herbicidal materials which are touted to be dust free, the herbicidal materials are adsorbed on the surface or in the interstices whereby they are subject to mechanical dislodgment in storage and transportation. This defect is promoted by methods of preparation wherein the herbicidal material in one physical state, namely, liquid or solution, is applied to the carrier in a solid state. In most so-called dustless compositions, carriers are inert materials such as sand, talc, diatomaceous earth, etc. which have no use other than as carriers and merely add to shipping costs. It can be seen from the foregoing that there is still unavailable a herbicidal product which is substantially free of dust and adequately resistant to abrasion, crushing and breakage, is uniform in composition and a completely utilizable composition.

It has been found, according to the present invention, that smooth, hard-surfaced spheroidal, free-flowing substantially dust-free herbicidal products may be obtained by mixing a herbicidal substance with or without other ingredients with urea, subjecting the resulting mixture to a temperature sufficient to provide a molten solution and ejecting said molten solution from a heated nozzle into a cooling tower. The resultant product is a smooth, hard-surfaced, spheroidal, dust-free product, which embodies an optimum distribution of the herbicidal agent throughout the spheroidal particle.

In the smooth, hard, spheroidal herbicidal product thus prepared, the sharp corners normally present in most pellet and granular compositions are eliminated, thus preventing abrasions and formation of dust and fines in handling and shipping. The hardness of the product confers thereto the property of resistance to crushing, breakage and abrasion. In contrast to methods employed in preparing conventional granular herbicides, no drying operation is required. The difficulty often encountered during drying operations, namely the formation of crystalline blooms on the surface of pellets which then rub off and cause dust problems, is thereby eliminated. The products prepared according to the present invention have additional advantages in manufacture and use. Thus, control of pellet size is readily accomplished in the preparation of the present products without the need of the additional step of screening required in the preparation of conventional granules. Moreover, the pellets of the present invention are adaptable to be dispersed in solvents to provide liquid spray compositions. Thus, the same product is utilizable in solid and liquid compositions, i.e., in dry application or in administration as aqueous or organic solvent solutions or dispersions. Further, the unique nature of the carrier employed, namely, urea, with its mildly hygroscopic properties, confers to the products a property of immediate release of the herbicidal toxicant when applied to plants. This is in contrast to conventional pellets and granules of inorganic carriers which require substantial rainfall or applied watering to mechanically break down the pellets and leach out the active ingredients. The herbicidal spheroids of the present invention have the added advantage of complete utilizability in that the urea carrier may fertilize the soil by supplying the nitrogen for the growth of desirable plant species. This is in contrast to other conventional carriers for granules which have no value other than as diluent.

The spheroidal herbicidal pellet or prill of the present invention may be made with any known herbicide which will form a suitable melt with urea or may be dispersed in molten urea without vaporization or degradation under the conditions of the process of the present invention. Particularly adaptable for the practice of the present invention are the organic acidic herbicide compounds, that is, the acidic herbicides and their corresponding derivatives such as amides, alkali metal and ammonium salts. Suitable classes of acidic heribicide compounds include haloaryloxy-substituted aliphatic acid compounds, chlorinated benzoic acid compounds, phenol compounds particularly halophenol compounds and haloaliphatic acid compounds. In the preferred embodiment of the present invention, the herbicidal materials are the haloaryloxy-substituted aliphatic acid and their sodium, potassium, lithium and ammonium salts. Examples of haloaryloxy-substituted aliphatic acids include 2,4-dichlorophenoxyacetic acid, 2,4,5-trichlorophenoxyacetic acid, 2,4,6-trichlorophenoxyacetic acid, 2,3,4,6-tetrachlorophenoxyacetic acid, pentachlorophenoxyacetic acid, p-bromophenoxyacetic acid, 2,4-dibromophenoxyacetic acid, 2,4,6-tribromophenoxyacetic acid, p-iodophenoxyacetic acid, p-fluorophenoxyacetic acid, 2,4-difluorophenoxyacetic acid, 4-chloro-o-toloxyacetic acid, 4-chloro-m-toloxyacetic acid, 4-chloro-2-ethylphenoxyacetic acid, 4-chloro-3,5-dimethylphenoxyacetic acid, 2-chloro-1-naphthoxyacetic acid, 2,4-dichloro-1-naphthoxyacetic acid, 2-(2,4,5-trichlorophenoxy)-propionic acid, α-[2-chloro-1-naphthoxy]-propionic acid and the corresponding haloaryloxy derivatives of higher aliphatic acids. Particularly suitable materials of the other classes include trichlorobenzoic acid, pentachlorophenol and trichloroacetic acid compounds.

In a further embodiment of the present invention, mixtures of herbicides may be employed, as well as mixtures wherein other compatible bioactive agents such as pesticides or microbicides, or inert marking agents such as dyes, or surface active agents are added in addition to the herbicidal material. In the preparation of such modified product, the added agent should satisfy the same property restrictions as does the herbicide, namely, soluble or dispersible in molten urea without vaporization or degradation under the process conditions. Under these conditions, a uniform distribution of the herbicide and other additives throughout the molten urea is obtained and a uniform composition of the herbicidal chemical and other additives in spheroids assured.

In carrying out the method of the present invention, the herbicidal substance and other agents, if employed, are mixed together and the resulting mixture heated to a temperature of from about 132° to about 200° C., preferably between 132° and 140° C. Below 132° C., the urea does not melt and above 200° C., the urea decomposes. Alternatively, the herbicidal substance may be added to the molten urea. Heat is applied until the mixture is completely molten. Thereafter, the temperature may be decreased to that required to keep the resulting mixture a liquid solution. Alternatively, and particularly useful when the herbicide is susceptible to decomposition on sustained heating, the herbicidal substance may be melted and the urea slowly added thereto. The molten solution comprising a herbicidal substance and urea is then passed through heated nozzles which may be of from about 0.1 to about 2.0 millimeters in inside diameter as a stream or jet into a cooling tower, whereupon the stream breaks up into individual droplets and hard spheroidal pellets are formed on passage through the air in the tower and are then collected at the bottom of the tower. Spheroidal pellets or prills may be made ranging in size from about 0.1 to 2.0 millimeters in diameter, although those ranging in size from about 0.25 to about 0.75 millimeter in diameter are considered preferred for use in a dry application for the control of undesirable vegetation. Spheroids of the preferred sizes, may be obtained by using a nozzle size of from 0.3 to 0.45 millimeter in inside diameter. The height of the cooling tower depends on the temperature of the set point of the particular composition of the herbicidal pellet. By "set point" is meant the temperature at which the composition becomes hardened by cooling. This varies with the particular herbicidal component and the relative amounts of herbicide and urea. Other factors influencing tower height include temperature of air in tower, velocity of ejection, angle of ejection, overall time in passage or free-fall, whether or not countercurrent gases are employed, etc. Thus, most suitable conditions can be readily determined experimentally by the skilled in the art.

The relative amount of herbicide to urea in the spheroidal pellets may vary depending on the ultimate end application as well as on the particular herbicide employed. Thus, where ultimately high concentrations of herbicide are required, the heribicide may comprise the major portion of the spheroid. From about 0.2 percent to about 70 percent by weight of herbicide based on acidic equivalent and correspondingly from about 99.8 percent to about 30 percent of urea may be employed. The preferred range of herbicide in the urea is from 0.2 to 25 percent by weight. By "acidic equivalent" is meant the amount calculated as the free acid or phenol where a derivative such as a salt or amide is employed.

As a preferred embodiment, the spheroidal pellets may be made to be completely water-soluble by employing water-soluble herbicides and additives, such pellets resulting in ready release of the toxic agent. This is conveniently accomplished by the use of herbicide in the form of water-soluble salts.

In carrying out the process for the control of noxious vegetation, a phytocidal quantity of the spheroidal dust-free herbicidal product prepared as hereinbefore described is applied to the noxious vegetation to be controlled. The amounts to be applied are such as to provide a comparable amount of the herbicide as would be administered in conventional form. Thus from ½ pound per acre of acid equivalent to about 100 pounds per acre may be applied, the exact amount depending on the particular application sought, i.e., whether selective herbicidal operation or a sterilizing operation is desired. The preferred amounts are known to those skilled in the herbicidal art.

When the product is to be employed in the preferred dry or solid applications, the spheroidal herbicidal product in appropriate amounts is applied with conventional aerial or dry application equipment.

Alternatively, liquid compositions may be prepared by dissolving or dispersing the spheroidal herbicidal product in suitable liquid media. Suitable solvents or dispersing media include water, acetone, xylene, petroleum hydrocarbon dstillates, e.g., Stoddard solvent, fuel oil, kerosene and naphtha. The liquid compositions may include surface active agents such as ionic or non-ionic dispersing and/or emulsifying agents. The choice of dispersing or emulsifying agent and the amount thereof employed is dictated by the nature of the composition type as well known to the skilled in the art. Suitable agents include condensation products of alkylene oxides with phenols and organic acid, alkyl aryl sulfonates, polyoxyethylene derivatives of sorbitan esters, complex ether alcohols, mahogany soaps and the like.

The following examples illustrate the present invention but are not to be construed as limiting.

Example 1

5 grams of 2,4-dichlorophenoxyacetic acid and 95 grams of urea were mixed together and heated to a temperature of about 135° C. The resulting molten solution was pumped into a heated 10 milliliter syringe and ejected through a heated spray nozzle of 0.026 inch in diameter into a cooling tower of 2½ feet in diameter and 8 feet in height. The cooled pellets were collected at the bottom of the tower and were found to consist of spherical particles, the majority of which ranged in size of from 100 to 250 microns in diameter. The resulting pellets contained 5 percent by weight of 2,4-dichlorophenoxyacetic acid.

These pellets were applied to soil for the preemergence of control of cotton, tomato, crab grass and water grass. A check operation was conducted simultaneously in which the soil was treated with 2,4-dichlorophenoxyacetic acid in an aqueous dispersion. It was found that the urea pellet of 2,4-dichlorophenoxyacetic acid gave substantially the same control of the undesirable plant species as did the check operation in which the soil was treated with an aqueous dispersion of 2,4-dichlorophenoxyacetic acid.

Example 2

1 pound of 2,4,5-trichlorophenoxyacetic acid and 19 pounds of urea are mixed together and the resulting mixture heated to about 135° C. The resulting molten solution is pumped through Yale B–D 27 gauge hypodermic needles (0.3175 millimeter, inside diameter) and sprayed into a ten foot cooling tower. The cooled spheroidal pellets are collected at the bottom of the tower and range from 0.25 to 0.75 millimeter in diameter with most being in the range of about 0.5 millimeter in diameter.

The resulting prills are applied to the foliage of cotton and bean plants and found to be absorbed by the plant and translocated into other areas of the plant to obtain the same herbicidal results as obtained by the administration of 2,4,5-trichlorophenoxyacetic acid by conventional methods.

Example 3

95 pounds of urea and 5 pounds of 4-chloro-o-toloxyacetic acid were mixed together and heated until a homogeneous melt was obtained (about 140° C.). The resulting melt was sprayed into the air at an angle of about 45° from a nozzle having an inside diameter of 0.36 millimeter into air at atmospheric temperature and allowed to free-fall for about 15 feet from the apex of the trajectory. The prills were collected at the bottom of the cooling tower. On screening, it was found that substantially all prills were from 0.4 to 0.9 millimeter in diameter.

The prills thus obtained are suitable in herbicidal operations.

*Example 4*

In similar operations, spheroidal products were prepared having the following compositions.

| Composition I. | Parts by weight |
|---|---|
| Urea | 95 |
| 2,4-dichlorophenoxyacetic acid | 5 |
| Composition II: | |
| Urea | 95 |
| 2,4,5-trichlorophenoxyacetic acid | 5 |
| Composition III: | |
| Urea | 95 |
| 2-(2,4,5-trichlorophenoxy)-propionic acid | 5 |
| Composition IV: | |
| Urea | 38 |
| 2,4-dichlorophenoxyacetic acid | 2 |
| Composition V: | |
| Urea | 57 |
| 2,4-dichlorophenoxyacetic acid | 3 |
| Composition VI: | |
| Urea | 28 |
| 2,4-dichlorophenoxyacetic acid | 1.5 |
| Composition VII: | |
| Urea | 85.5 |
| 2,4-dichlorophenoxyacetic acid | 4.5 |

The spheroidal pellets above prepared were substantially all in the size range of 0.5 to 0.7 millimeter in diameter.

The spheroidal products are suitable in herbicidal operations.

*Example 5*

In other operations carried out in a similar manner, the following spheroidal herbicidal products are prepared.

| Composition VIII: | Parts by weight |
|---|---|
| Urea | 89 |
| Sodium 2,4-dichlorophenoxyacetate | 11 |
| Composition IX: | |
| Urea | 80 |
| Ammonium 2,4,5-trichlorophenoxyacetate | 20 |
| Composition X: | |
| Urea | 90 |
| Lithium 4-chloro-o-toloxyacetate | 10 |
| Composition XI: | |
| Urea | 98 |
| Ammonium 2,4-dichlorophenoxyacetate | 2 |
| Composition XII: | |
| Urea | 90 |
| Pentachlorophenol | 10 |
| Composition XIII: | |
| Urea | 95 |
| 2,3,6-trichlorobenzoic acid | 5 |
| Composition XIV: | |
| Urea | 85 |
| Ammonium pentachlorophenoxide | 15 |

The spheroidal pellets thus prepared vary from about 500 to 700 microns in diameter and are suitable for systemic control of undesirable plant species.

*Example 6*

Spheroidal pellets of 5 percent 2,4-dichlorophenoxyacetic acid in urea and prepared as previously described were administered to plots for pre-emergence control of plant species such as cotton, amaranth, tomato, crab grass and water grass. Applications were made at a rate of 10 pounds per acre. The results obtained were as follows.

| Species: | Percent control |
|---|---|
| Cotton | 100 |
| Amaranth | 100 |
| Tomato | 100 |
| Crab grass | 100 |
| Water grass | 90 |

Untreated check plots show no control of the plant species.

*Example 7*

5 percent herbicide–95 percent urea prills were prepared as previously described:

Composition A—2,4-dichlorophenoxyacetic acid–urea
Composition B—4-chloro-o-toloxyacetic acid–urea
Composition C—2,4,5-trichlorophenoxyacetic acid–urea
Composition D—2-(2,4,5-trichlorophenoxy)propionic acid–urea In separate operations, a portion of the prills of each composition were dissolved in water to obtain spray compositions containing ½ pound, 1 pound and 2 pounds per 25 gallons for administration at rates of ½ pound, 1 pound and 2 pounds per acre.

In separate operations, the herbicide compositions were applied both as dry application and as spray application to plots (10 feet x 30 feet) of highly organic soil planted to field corn and infested with undesirable species as *Brassica nigra* and other Brassica sp., Chenopodium sp., Amaranthus sp. and *Enchinochloa crusgalli*. Applications of prills were made starting at 6:30 a.m. when air temperature was 63° F. and the foliage was covered with dew. The prills adhered to the leaves of corn and weeds and began to dissolve almost immediately. Spray applications were made between 2:00 and 5:00 p.m. with air temperatures ranging from 93° to 95° F. One plot was left untreated to serve as a check.

After a period of 17 days, observations were made. The corn had grown from 2½ feet to 6–7 feet tall within this period. The control of the weeds is summarized in the following table:

| Herbicide Composition | Physical State | Control [1] (Average) | | |
|---|---|---|---|---|
| | | ½#/Acre | 1#/Acre | 2#/Acre |
| A | Prill | 3.4 | 3.5 | 3.6 |
| A | Spray | 3.3 | 3.6 | 3.7 |
| B | Prill | 3.3 | 3.5 | 3.8 |
| B | Spray | 3.5 | | |
| C | Prill | 3.1 | 3.3 | 3.4 |
| C | Spray | 3.1 | | |
| D | Prill | 3.1 | 3.0 | 3.5 |
| D | Spray | 3.3 | | |
| Check | | 0 | 0 | 0 |

[1] Control based on 4=complete control and 0=no control.

*Example 8*

5 percent 2,4-dichlorophenoxyacetic acid–95 percent urea prills were employed for pre-emergence control of rape.

Plots (5 feet x 20 feet) were planted to rape seed prior to rototilling sandy loam soil of pH 5.6 to 5.8. Prills were applied in a dichondra spreader at rates of ½ pound/acre, 1 pound/acre, 2 pounds/acre and 3 pounds/acre. A check plot was left untreated. 29 days after treatment, the plots were examined for control of rape and rated on the basis of 10 for complete control and 0 for no control. The results were as follows:

| Rate in pounds/acre: | Control (average of 3 replications) |
|---|---|
| ½ | 6.7 |
| 1 | 7.7 |
| 2 | 8.3 |
| 3 | 9.2 |
| 0 (check) | 2.0 |

Example 9

5 percent 2,4-dichlorophenoxyacetic acid–95 percent urea prills were employed for post-emergence control of weeds including *Calandrinia caulescens, Spergula arvensis, Amsinckia douglasiana* and different Brassica species growing in wheat field with wheat 8 to 14 inches in height. Applications of the prills were made when the foliage was wet with dew at rates of ½ pound, 1 pound, 2 pounds and 4 pounds per acre. A check plot was left untreated. All treated plots had 70 to 80 percent control of undesirable weeds whereas there was no control in the untreated check plot.

I claim:

1. A method of preparing a smooth, hard-surfaced, spheroidal, free-flowing, substantially dust-free herbicidal product which comprises mixing a herbicidal substance with urea, subjecting the resulting mixture to a temperature sufficient to provide a molten solution and ejecting said molten solution from a heated nozzle into a cooling tower.

2. A method of preparing a smooth, hard-surfaced, spheroidal, free-flowing, substantially dust-free herbicidal product which comprises mixing a herbicidal substance with urea, subjecting the resulting mixture to a temperature of from about 132° to about 140° C. to provide a molten solution and ejecting said molten solution from a heated nozzle into a cooling tower.

3. A method of preparing a smooth, hard-surfaced, spheroidal, free-flowing, substantially dust-free herbicidal product which comprises mixing a chlorinated aryloxyacetic acid compound with urea, subjecting the resulting mixture to a temperature sufficient to provide a molten solution and ejecting said molten solution from a heated nozzle into a cooling tower.

4. A method of preparing a smooth, hard-surfaced, spheroidal, free-flowing, substantially dust-free herbicidal product which comprises mixing 2,4-dichlorophenoxyacetic acid compound with urea, subjecting the resulting mixture to a temperature sufficient to provide a molten solution and ejecting said molten solution from a heated nozzle into a cooling tower.

5. A method of preparing a free-flowing, smooth, hard-surfaced, spheroidal, substantially dust-free herbicidal product which comprises mixing 2,4,5-trichlorophenoxyacetic acid compound with urea, subjecting the resulting mixture to a temperature sufficient to provide a molten solution and ejecting said molten solution from a heated nozzle into a cooling tower.

6. A free-flowing, substantially dust-free herbicidal product consisting of a smooth, hard, spheroid of from about 0.1 to 2.0 millimeters in diameter comprising urea as carrier medium and having intimately incorporated therein a phytocidal amount of a haloaryloxyaliphatic acid as the herbicidal substance, said herbicidal product being prepared by mixing the herbicidal substance with urea, subjecting the resulting mixture to a temperature sufficient to provide a molten solution and ejecting said molten solution from a heated nozzle into a cooling tower.

7. A product as defined in claim 6 wherein the herbicidal substance is 2,4-dichlorophenoxyacetic acid.

8. A product as defined in claim 6 wherein the herbicidal substance is 2,4,5-trichlorophenoxyacetic acid.

9. A method for producing a smooth, hard-surfaced, spheroidal, free-flowing, substantially dust-free herbicidal product which comprises mixing a herbicidal substance with urea, subjecting the resulting mixture to a temperature sufficient to provide a molten solution and then prilling the molten solution.

10. A method for producing a smooth, hard-surfaced, spheroidal, free-flowing, substantially dust-free herbicidal product which comprises mixing a herbicidal substance wtih urea, subjecting the resulting mixture to a temperature of from about 132° to about 140° C. to provide a molten solution and then prilling the molten solution.

11. A process for controlling noxious vegetation which comprises treating noxious vegetation with a phytocidal quantity of the herbicidal product consisting of a smooth, hard, dust-free, spheroid of from about 0.1 to 2.0 millimeters in diameter comprising urea as carrier medium and having intimately incorporated therein a phytocidal amount of a haloaryloxyaliphatic acid as the herbicidal substance, said herbicidal product being prepared by mixing the herbicidal substance with urea, subjecting the resulting mixture to a temperature sufficient to provide a molten solution and ejecting said molten solution from a heated nozzle into a cooling tower.

12. A method for producing a smooth, hard-surfaced, spheroidal, free-flowing, substantially dust-free herbicidal product which comprises mixing a chlorinated aryloxyacetic acid compound with urea, subjecting the resulting mixture to a temperature sufficient to provide a molten solution and thereafter prilling the molten solution.

13. A method for producing a smooth, hard-surfaced, spheroidal, free-flowing, substantially dust-free herbicidal product which comprises mixing 2,4-dichlorophenoxyacetic acid compound with urea, subjecting the resulting mixture to a temperature sufficient to provide a molten solution and thereafter prilling the molten solution.

14. A method for producing a smooth, hard-surfaced, spheroidal, free-flowing, substantially dust-free herbicidal product which comprises mixing 2,4,5-trichlorophenoxyacetic acid compound with urea, subjecting the resulting mixture to a temperature sufficient to provide a molten solution and thereafter prilling the molten solution.

References Cited in the file of this patent

UNITED STATES PATENTS

| | | |
|---|---|---|
| 2,663,731 | Micheltsch | Dec. 22, 1953 |
| 2,739,053 | Morrill | Mar. 20, 1956 |
| 2,792,295 | Wright | May 14, 1957 |
| 2,919,184 | Osswald et al. | Dec. 29, 1959 |

OTHER REFERENCES

Stummeyer in "Chemical Abstracts," vol. 52, No. 17, 1958, col. 14958(e).

Hanna: "Hanna's Handbook of Agricultural Chemicals," 2nd edition, copyright 1958, pages 107 and 108.